March 18, 1958 S. F. RAIA 2,827,134
SAFETY ARRANGEMENT FOR HYDRAULIC SYSTEMS
Filed Dec. 2, 1955
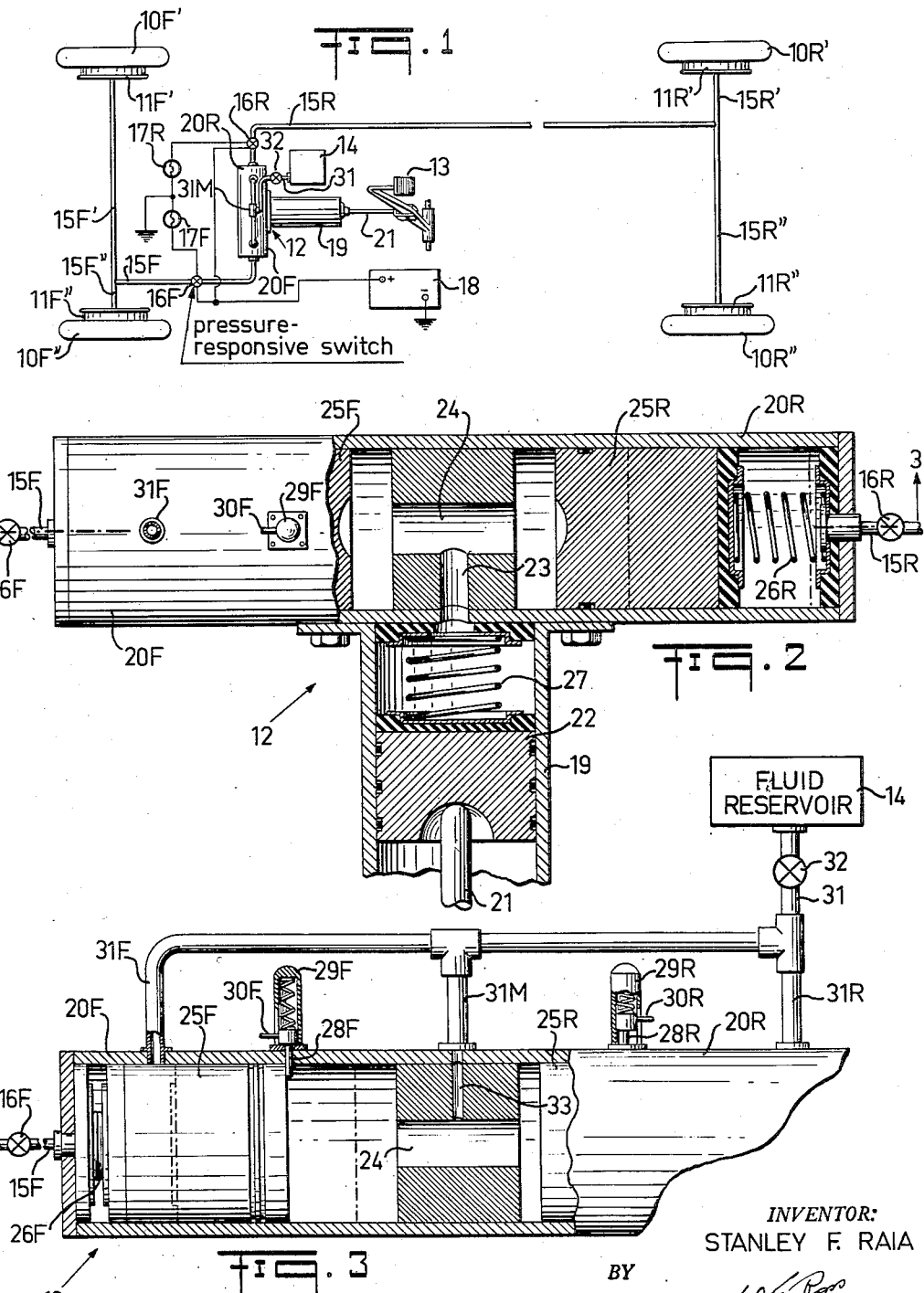
INVENTOR:
STANLEY F. RAIA
BY
AGENT

United States Patent Office 2,827,134
Patented Mar. 18, 1958

2,827,134

SAFETY ARRANGEMENT FOR HYDRAULIC SYSTEMS

Stanley F. Raia, Westbury, N. Y.

Application December 2, 1955, Serial No. 550,613

2 Claims. (Cl. 188—151)

My present invention relates to hydraulic brake systems as used, for example, in automotive vehicles, more particularly to such systems in which a plurality of hydraulic lines extend from a common source of fluid to different brake members responsive to a single control device.

In automotive brake systems it is customary to provide a central master cylinder which supplies fluid to a plunger controlled by the usual brake pedal, the pressure exerted by this plunger being simultaneously communicated to the brake shoe of each wheel by way of individual conduits or conduits common to respective groups of wheels, such as the front wheels and the rear wheels of the vehicle. If in such system a leak should develop in any fluid line, the resulting loss in pressure affects not only the brake assembly directly connected to such line but also every other brake assembly supplied from the common master cylinder, thereby putting the entire system out of commission.

The present invention has for its general object the provision of means for so isolating the several fluid lines from one another that a failure in one line will not impair the usefulness of the brake assembly or assemblies connected to the remaining line or lines.

In practice, considering the case of a four-wheel automotive vehicle, it will usually be sufficient to provide mutual isolation between a first conduit supplying the two front brake assemblies and a second conduit supplying the two rear brake assemblies. With such arrangement, failure of fluid pressure at, say, the left front brake will also disable the right front brake but will leave unaffected the two rear brakes, this being advantageous in that the driver would find it more difficult to maintain control if brake failure should occur at only a single front (or rear) wheel. Since the transition from four-wheel brake to two-wheel brake may in fact pass unnoticed, it is a further object of my invention to provide means for indicating, preferably visually, that one of the fluid lines in the system has become defective.

Basically, my invention utilizes a plurality of auxiliary pistons, one for each fluid line, as a means for isolating the lines from one another. Normally, the pressure exerted upon these pistons by the common plunger will be divided equally (or in some other predetermined ratio) among them so that each piston will be displaced only to a limited extent when the plunger is fully actuated. These pistons, in turn, act upon their respective brake assemblies through the fluid present in the associated hydraulic lines. If, now, a break occurs in any line, the corresponding piston yields more readily than the others under the plunger pressure and moves to an extreme off-normal position in which it is retained by a suitable detent until the break has been repaired. At the same time, additional fluid from the master cylinder enters the space between the pistons to compensate for the loss, this fluid remaining trapped in said space by means of a check valve or equivalent no-return device. The piston associated with the defective line is now wholly immobilized and acts as a stationary wall sealing off the broken line.

The invention will be better understood from the following detailed description of a preferred embodiment, reference being had to the accompanying drawing in which:

Fig. 1 is a diagrammatic view of the wheel and brake assemblies of an automotive vehicle provided with a hydraulic system according to the invention;

Fig. 2 is an enlarged top view, partly in section, of the plunger and piston arrangement forming the heart of my improved system; and Fig. 3 is an elevational view, partly in section, of the arrangement of Fig. 2, taken on the line 3—3 thereof and showing the system with one of its pistons in an inactive position.

In Fig. 1 I have shown part of an automobile chassis including the two front wheels 10F', 10F" and the two rear wheels 10R', 10R", each with its brake cylinder 11F', 11F" and 11R', 11R", respectively. The cylinder assembly 12, shown in greater detail in Figs. 2 and 3, is under control of a brake pedal 13 and is connected to a source of substantially non-compressible brake fluid shown as a reservoir 14. From the assembly 12 a first hydraulic line 15F extends toward the front and divides into two branches 15F', 15F" terminating at the brake cylinders 11F' and 11F", while similarly a second hydraulic line 15R extends toward the rear and divides into two branches 15R', 15R" leading toward cylinders 11R' and 11R". An electric switch 16F in line 15F and a similar switch 16R in line 15R serve to connect respective signal lamps 17F and 17R between battery 18 and ground, both switches being adapted to respond to fluid pressure in their associated lines; lamps 17F and 17R are preferably mounted on the dashboard (not shown) of the vehicle.

The assembly 12 is divided into a main cylinder 19 and a pair of auxiliary cylinders 20F, 20R, the latter having outlets coupled to hydraulic lines 15F and 15R, respectively. A rod 21, fastened to pedal 13, enters cylinder 19 and operatively engages a plunger 22 therein as shown in Fig. 2. This cylinder has an outlet 23 communicating with a transverse channel 24 whose opposite ends open into the cylinders 20F and 20R, respectively. Pistons 25F, 25R are slidably positioned in the last-mentioned cylinders and are under pressure of respective expansion springs 26F, 26R urging them toward the inlet channel 24. A similar spring 27 bears upon plunger 22 in a sense urging it away from outlet 23 and tending to maintain pedal 13 in a normal, raised position.

A pair of spring-loaded detent pins 28F, 28R are mounted in housings 29F, 29R atop the auxiliary cylinders 20F, 20R, respectively, and penetrate the walls thereof yet are normally maintained in an elevated position by the pistons 25F and 25R. It will be noted that the width of these pistons and the position of the pins 28F, 28R is such that the latter can descend only if the pistons are displaced beyond an intermediate position shown in Fig. 2 and also (dot-dash lines, piston 25F) Fig. 3. Spurs 30F, 30R, rigid with pins 28F, 28R, extend laterally outwardly from housings 29F, 29R to enable manual raising of either pin if it should have left its normal, unoperated position under circumstances as described hereinafter.

A fluid-supply line 31, containing a check valve 32, extends downwardly from reservoir 14 and divides into three branches 31M, 31F and 31R. Branch 31M communicates with channel 24 by way of a bore 33; branches 31F and 31R enter the cylinders 20F and 20R at locations close to the outlet ends thereof, either of these branches being obstructed by the respective piston cylinders 25F or 25R if the latter occupies a position at the extreme end of its path in which it can be locked by its detent pin 28F or 28R.

In normal operation of the system, fluid from reservoir 14 fills the passage 23, 24 and also that part of cylinder 19 which is between these passages and plunger 22. This body of fluid is displaced if the driver steps on pedal 13 and advances the plunger 22; pressure is now exerted upon pistons 25F, 25R which accordingly move from a normal position (shown in Fig. 3 for piston 25R) toward their intermediate positions, thereby displacing the fluid accumulated in the outer portions of cylinders 20F and 20R. The latter fluid acts upon the brake cylinders 11F', 11F" and 11R', 11R" as well as upon the switches 16F, 16R which cause the lamps 17F, 17R to light, thereby indicating to the driver that the system is functioning properly as a four-wheel brake. It will be understood that in this normal situation the pressure of plunger 22 is resisted not only by the springs 26F, 26R, 27 but also by spring pressure at the individual brake assemblies, the latter pressure being communicated to pistons 25F, 25R through the fluid present in the transmission lines 15F and 15R.

Let us now assume, however, that a leak develops in the front feeder line 15F or in one of its branches 15F', 15F". When the brake pedal 13 is operated, the "front" cylinder 25F yields much more readily than the "rear" cylinder 25R to the pressure of the fluid in channel 24. Since the pressure upon piston 25R cannot rise above the reaction force developed by piston 25F, the former is displaced very little or not at all while the latter moves toward an extreme position illustrated in Fig. 3. The depressing of the brake pedal thus remains ineffective and the signal lamps 17F, 17R remain dark.

In this situation the operator, instinctively or by design, will briefly raise his foot and then step once more upon the pedal. At the instant when the pedal is released, spring 27 drives back the plunger 22 but spring 26F is unable to restore piston 25F to normal, this piston having been locked by detent pin 28F which was projected by its spring into the path of the piston. Fluid from reservoir 14 streams into channel 24 to fill the partial vacuum left by the withdrawal of plunger 22. As the pedal is again depressed, this fluid cannot return to reservoir 14 because of the presence of check valve 32, nor can any part of it reach the defective line 15F inasmuch as the outlet of branch 31F is blocked by the piston 25F. Thus, the pressure of the fluid is now effective to displace the piston 25R, thereby operating the rear brakes at wheels 10R', 10R" in the normal manner and causing lamp 17R to light.

The operator, noting that stepping upon the brake pedal will fail to light "front" lamp 17F, will then have the forward part of the hydraulic system inspected and repaired. After the leak has been stopped, spur 30F is raised to withdraw pin 28F into its housing 29F, thereby enabling spring 26F to restore piston 25F to normal. As this piston returns toward the center of cylinder assembly 12, it exerts pressure upon the body of fluid confined therein which at first may cause piston 25R to move outward a small distance; as soon as piston 25F has moved sufficiently far inward to unblock supply line 31F, the excess fluid present in the central chamber to the right of this piston (as viewed in Figs. 2 and 3) is free to pass via channel 24, bore 33, branch 31M and branch 31F toward the outer part of cylinder 20F, on the left of the piston, and the system is restored to its normal unoperated condition.

It will be understood that a leak in rear feeder line 15R would have caused piston 25R to move into an extreme outward position (dot-dash lines, Fig. 2) in which it would have been locked by the descent of pin 28R, and that a second stepping upon the pedal 13 would have operated piston 25F in the normal manner and would have energized lamp 17F but not lamp 17R. The restoration of the system to normal would have taken place in analogous manner.

My invention is not limited to the specific embodiment described and illustrated but may be realized in various modifications and adaptations without departing from the spirit and scope of the appended claims.

I claim:

1. A hydraulic brake system comprising first and second brake means, a main cylinder having a discharge opening, a cylindrical chamber having two closed ends, an annular member positioned centrally in said chamber and dividing same into a first auxiliary chamber and a second auxiliary chamber, said annular member being provided with a radial inlet passage and being further provided with a radial aperture communicating with said discharge opening for admitting a hydraulic fluid from said main cylinder into both of said auxiliary chambers, first and second cylindrical pistons positioned in said first and second auxiliary chambers, respectively, with freedom of movement between said annular member and a respective end of said cylindrical chamber, spring means in said cylindrical chamber urging said pistons inwardly toward said annular member, said annular member forming an abutment limiting the inward displacement of said pistons by said spring means, plunger means in said main cylinder actuatable for exerting upon said pistons a fluid pressure tending to displace them outwardly toward said ends against the force of said spring means, each of said auxiliary chambers being provided with an outlet positioned at a respective end of the cylindrical chamber and being further provided with a peripheral supply inlet positioned near said end at a location in which said supply inlet is obstructed by the corresponding piston in an off-normal position remote from said annular member, first and second hydraulic lines connecting said first and second brake means with the outlets of said first and second auxiliary chambers, respectively, a fluid reservoir, conduit means connecting said reservoir with said supply inlets, and detent means at each of said auxiliary chambers for automatically immobilizing the respective piston in said off-normal position upon a greater-than-normal outward displacement of the piston by an excessive pressure differential due to a failure in the associated hydraulic line, said detent means being positioned to be inoperative by the cylindrical peripheries of said pistons upon limited outward displacement thereof in response to normal pressure differential.

2. A hydraulic brake system comprising first and second brake means, a main cylinder having a discharge opening, a cylindrical chamber having two closed ends, abutment means positioned centrally in said chamber and dividing same into a first auxiliary chamber and a second auxiliary chamber, means communicating with said discharge opening for admitting a hydraulic fluid from said main cylinder into both of said auxiliary chambers, first and second cylindrical pistons positioned in said first and second auxiliary chambers, respectively, with freedom of movement between said abutment means and a respective end of said cylindrical chamber, spring means in said cylindrical chamber urging said pistons inwardly toward said abutment means, said abutment means limiting the inward displacement of said pistons by said spring means, plunger means in said main cylinder actuatable for exerting upon said pistons a fluid pressure tending to displace them outwardly toward said ends against the force of said spring means, each of said auxiliary chambers being provided with an outlet positioned at a respective end of the cylindrical chamber and being further provided with a peripheral supply inlet positioned near said end at a location in which said supply inlet is obstructed by the corresponding piston in an off-normal position remote from said abutment means, first and second hydraulic lines connecting said first and second brake means with the outlets of said first and second auxiliary chambers, respectively, a fluid reservoir, conduit means connecting said reservoir with said supply inlets, and detent means at each of said auxiliary chambers for automatically immobilizing the respective piston in said off-normal position upon a greater-than-normal outward displacement of the piston by an excessive pressure differential due to a failure in the associated hydraulic line, said detent means being positioned to be inoperative by the cylindrical peripheries of said pistons upon limited outward displacement thereof in response to normal pressure differential.

References Cited in the file of this patent

UNITED STATES PATENTS

| | | |
|---|---|---|
| 1,911,634 | Madden | May 30, 1933 |
| 1,952,557 | Masteller | Mar. 27, 1934 |
| 2,056,940 | Francis et al. | Oct. 13, 1936 |
| 2,203,908 | Hess | June 11, 1940 |
| 2,332,301 | Cox | Oct. 19, 1943 |
| 2,568,311 | Wise et al. | Sept. 18, 1951 |

FOREIGN PATENTS

| | | |
|---|---|---|
| 226,590 | Switzerland | Aug. 2, 1943 |